United States Patent [19]

Anderson

[11] Patent Number: 5,339,729
[45] Date of Patent: Aug. 23, 1994

[54] FRUIT JUICE EXTRACTION PRESS
[75] Inventor: David N. Anderson, Lakeland, Fla.
[73] Assignee: FMC Corporation, Chicago, Ill.
[21] Appl. No.: 65,787
[22] Filed: May 24, 1993

Related U.S. Application Data

[63] Continuation of Ser. No. 662,654, Mar. 1, 1991, abandoned.

[51] Int. Cl.⁵ .............................. A23N 1/02; B30B 9/02
[52] U.S. Cl. .................................... 99/509; 99/495;
100/98 R; 100/213; 100/245
[58] Field of Search ................ 99/495, 509, 510, 513;
100/37, 98 R, 104, 108, 130, 213, 264, 245, 125, 115

[56] References Cited

U.S. PATENT DOCUMENTS

| | | | |
|---|---|---|---|
| 160,697 | 3/1875 | Newberger | 100/213 |
| 2,346,561 | 4/1944 | Delay | 100/98 R |
| 2,534,554 | 12/1950 | Kahre | 100/213 |
| 3,108,533 | 10/1963 | Read et al. | 100/125 |
| 3,236,175 | 2/1966 | Belk | 100/213 |
| 3,682,092 | 7/1970 | Breton et al. | |
| 3,736,865 | 4/1971 | Hait | |
| 3,807,297 | 4/1974 | Marrie | 100/213 |
| 3,866,528 | 2/1975 | Montagroni | 99/495 |
| 4,300,449 | 11/1981 | Segredo | 99/496 |
| 4,376,409 | 3/1983 | Belk | 99/509 |
| 4,700,620 | 10/1987 | Cross | 99/510 |
| 4,905,586 | 3/1990 | Anderson et al. | 99/509 |
| 4,922,813 | 5/1990 | Compri | 99/495 |
| 4,922,814 | 5/1990 | Anderson et al. | 100/213 |
| 4,951,563 | 8/1990 | Warren et al. | 99/495 |

FOREIGN PATENT DOCUMENTS

| | | | |
|---|---|---|---|
| 1115542 | 4/1956 | France | 100/108 |
| 81435 | 1/1987 | Israel | |
| 92510 | 10/1989 | Israel | |
| 91599 | 11/1989 | Israel | |

Primary Examiner—Timothy F. Simone
Attorney, Agent, or Firm—Douglas W. Rudy; Richard B. Megley

[57] ABSTRACT

A juice press for extracting the juice from a non-citrus fruit or vegetable uses a pair of cups into which a press plunger is cycled to the fruit to be processed to be compressed and extruded through an orifice tube wherein a significant volume of juice will be pressed.

10 Claims, 2 Drawing Sheets

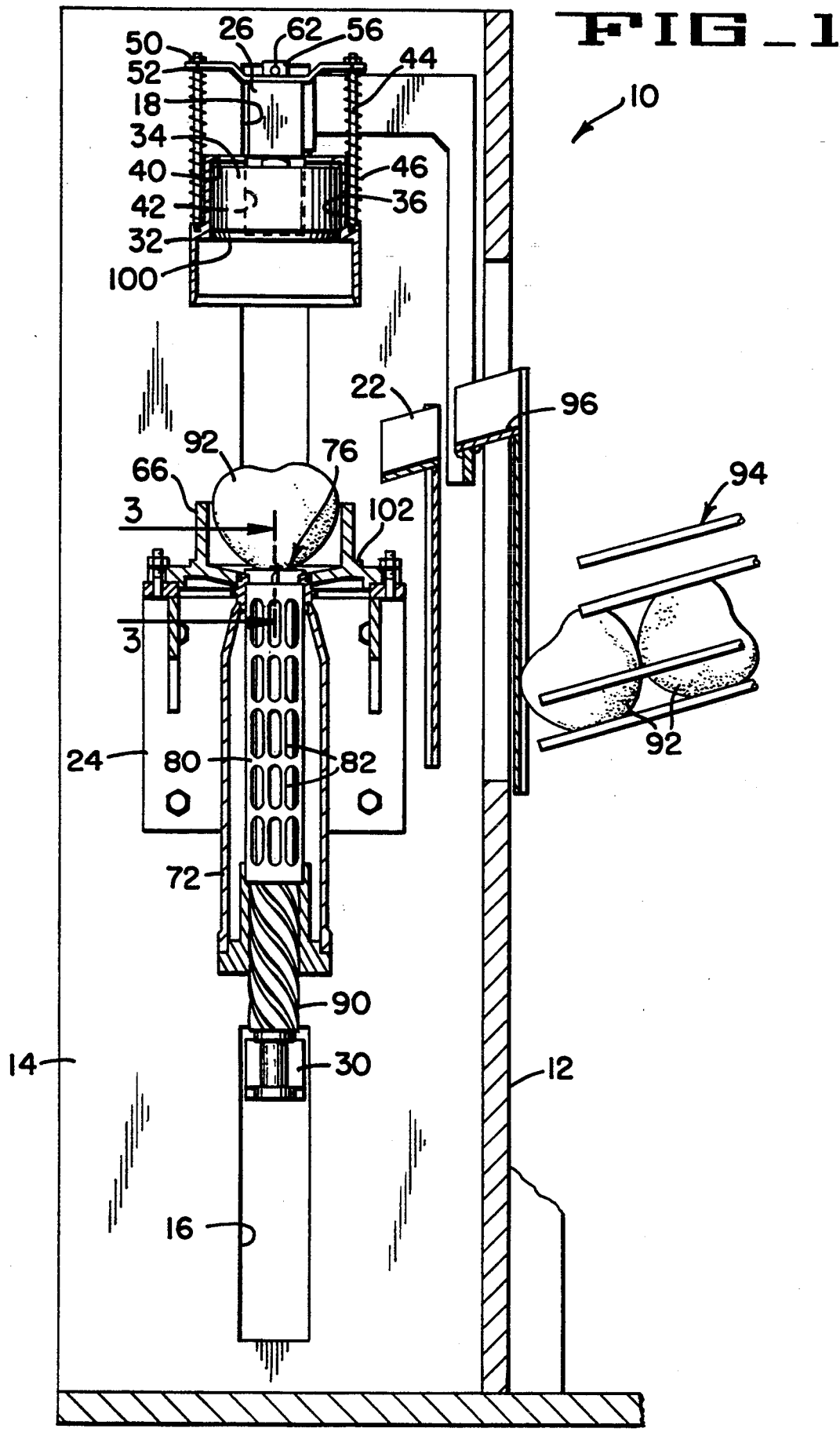

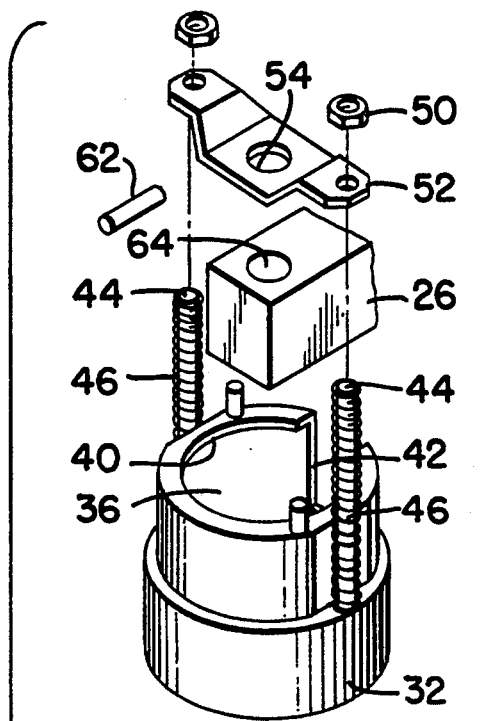
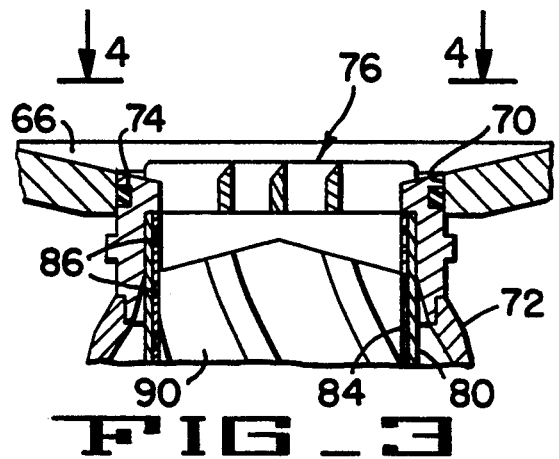
FIG_3
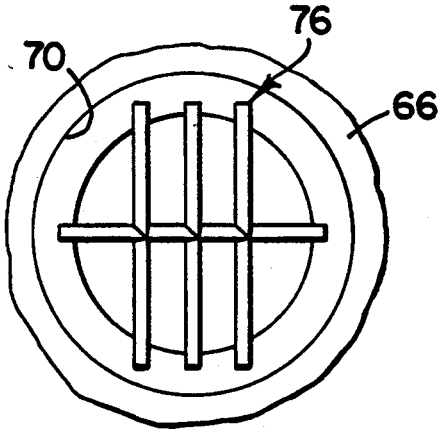
FIG_4
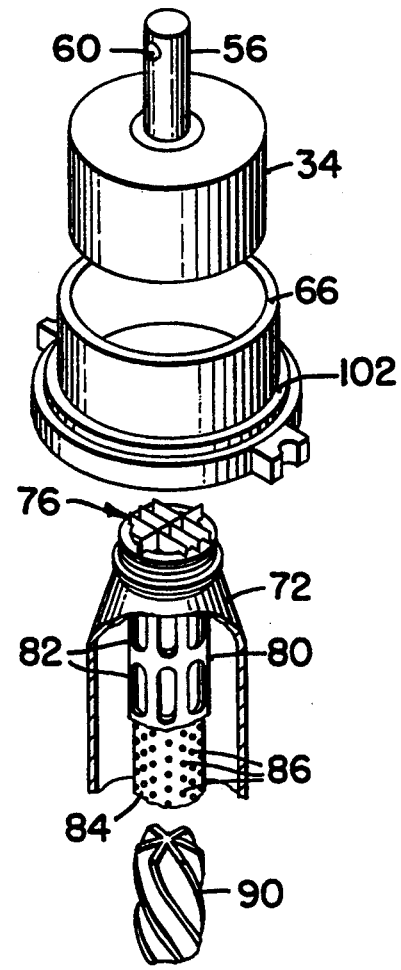
FIG_2

FRUIT JUICE EXTRACTION PRESS

This application is a continuation of U.S. application Ser. No. 07/662,654, filed Mar. 1, 1991, now abandoned.

BACKGROUND OF THE INVENTION

Field of the Invention

This invention has to do with juice extractors or juice presses of the type known as "point-of-sale" juice extractors. Specifically this invention has to do with a method of extracting juice from non-citrus fruit and vegetables using a juice press having an orifice tube or fluted column "post-squeeze" secondary extraction device or secondary press zone.

Various point-of-sale juice extractors have been developed, including a citrus juice extractor for point-of-sale use developed by FMC Corporation, that work well in the extraction of juice from citrus fruit. Undoubtedly, there have also been developments point-of-sale juice extractors that can extract juice from non-citrus fruits such as apples. Often times these extractors are of the press type where apples are loaded into a chamber and compressed between two closing surfaces. The squeezing pressure causes the juice to be extracted from the batch of apples in the chamber. Although this "apple press" technology is very old improvements to it appear with regularity. But the fruit juice extractor presented herein is different from any of the apple press type heretofore known. The applicant isn't aware of any non-citrus point-of-sale juice extractors that can be used as both a citrus juice extractor and as a non-citrus juice extractor using, in particular the orifice tube principle used in this extractor. Even more broadly, the applicant believes that there are no existing point-of-sale juice extractors that are marketed for the quality production, at a reasonably high volume rate, of both citrus and non-citrus fruits.

SUMMARY OF THE INVENTION

A juice extractor for extracting juice from non-citrus fruit and vegetables incorporates a plurality of components that can be fitted into a known fruit juice extractor to convert the known juice extractor to one that is uniquely designed for extracting juice from non-citrus fruits and vegetables. The components of this invention are fitted into and replace components in a point-of-sale juice extractor made by FMC Corporation and known as a Fresh N Squeeze ™ juice extractors. Examples of these extractors are shown in U.S. Pat. Nos. 4,905,586 and 4,922,815 issued on Mar. 6, 1990 and May 8, 1990 respectively.

The components can also be adapted to other fruit juice extractors and would be the core elements needed to extract juice from non-citrus fruits and vegetables. In these issued patents the relationship between the rive means and the press plunger arm is clearly seen. The drive means is also shown in these patents and the relationship between these elements id clearly shown. The instant application is directed to the cups that are used and the spiral tube that moves through the perforated tube 90. The drive means is not critical to this invention and coupled be of several different types with the preferred embodiment being that shown in the earlier recited U.S. Patents.

The major components of the invention include a press plunger reciprocally mounted in solid walled interacting cups. A compressed pulp and juice passage allows the pulp and juice to exit the cups. The pulp is secondarily juiced by a strainer tube/external orifice tube assembly wherein the external orifice tube is mounted for reciprocal movement in the strainer tube.

BRIEF DESCRIPTION OF THE DRAWING FIGURES

One embodiment of the invention is shown in the drawing figures wherein:

FIG. 1 is a partially sectioned cross sectional view of a portion of a juice extractor;

FIG. 2 is a perspective presentation of various components of the invention shown is a disassembled view with portions of some parts broken away for clarity;

FIG. 3 is a section taken along lines 3—3 of FIG. 1;

FIG. 4 is a plan view taken looking in the direction of arrows 4—4 of FIG. 3.

DETAILED DESCRIPTION OF THE INVENTION

Turning first to FIG. 1 the usual embodiment of the invention can be seen. In this Figure the juice press, generally 10 is supported in a frame 12 including a housing plate 14 with a first elongated aperture 16 and a second elongated aperture 18 loading guide 22 and a lower cup support 24.

An upper cup drive arm 26 projects through the housing plate 14 second elongated aperture 18 and is mounted for vertical reciprocal motion therein. In a similar way an orifice tube drive arm 30 projects through the housing plate first elongated aperture 16 and is mounted for vertical reciprocal motion therein.

Mounted to the upper cup drive arm referring now to FIGS. 1 and 2 is an upper solid wall cup 32, the press plunger 34 and necessary mounting hardware. The press plunger 34 is carried inside the upper cup 32 normally in the upper zone 36 of the upper cup. A flange 40 projects inwardly from the interior surface of the upper zone 36 of the upper cup and is of such a dimension to prevent the press plunger 34 from being removed through the top of the upper zone as the diameter of the upper surface of the press plunger extends underneath the flange 40.

The upper zone 36 of the upper cup is formed with an access slot 42 that aligns with the second elongated aperture 18 when the upper cup 32 is mounted for use as shown in FIG. 1.

Extending upwardly from the upper cup are a pair of threaded studs such as 44 which accommodate and locate over-travel springs such as 46. Between the over-travel springs 46 and fasteners such as 50 a cup hanger bracket 52 is carried on the threaded studs 44. The cup hanger bracket 52 has three apertures, two that accommodate the threaded studs 44 and one larger, centrally located aperture 54. As described further on this upper cup mounting arrangement provides for lost motion operation.

The press plunger 34 is mounted to the upper cup drive arm 26 by means of a vertical stub shaft 56 attached to the upper surface of the press plunger. The vertical stub shaft is provided with a through aperture 60 into which retaining pin 62 can be inserted.

To mount the press plunger 34 and the upper cup 32 to the upper cup drive arm 26, the press plunger 34 inserted into the interior of the upper cup such that the stub shaft 56 projects through the aperture 64 in the upper cup drive arm 26 and then through aperture in the cup hanger bracket 52 sufficiently for it to expose the through aperture 60 of the stub shaft above the top surface of the upper cup drive arm. With this aperture 60 exposed the retaining pin 62 can be inserted in the aperture 60 and thereby maintain the press plunger as well as the upper cup on the upper cup drive arm.

A lower cup 66, having solid sides and an apertured bottom, is supported on and fastened to the lower cup support 24. This cup, in a preferred embodiment will have an outside diameter that is smaller, but very close to the inside diameter of the lower portion of the upper cup 32. The interior diameter of the lower cup 66 will be slightly larger than the diameter of the press plunger 34 so that the press plunger can cycle into and out of the lower cup 66.

The apertured bottom of the lower cup 66, the aperture being 70, as shown plainly in FIGS. 3 and 4, accommodates a juice collecting sump or juice manifold 72. A seal 74 may be used to stem leakage of fluid from the lower cup during operation of the press.

A knife assembly 76 of any blade configuration, a preferred configuration shown, may be positioned at the upper inlet of the juice manifold 72.

Downstream of this knife assembly and inside the juice manifold is a strainer tube 80 comprised of an outer perforated tube having large apertures 82 therein and an inner perforated tube 84 having small perforations 86 therein.

Carried by the orifice tube drive arm 30 is an orifice tube 90 which extends vertically and upward from the orifice tube drive arm into the interior of the perforated tube 84. The orifice tube 90 is shown to have a spiral orifice on its exterior which will allow the passage of relatively dry pulp through the spiral orifices of the orifice tube.

The operation of this juice press is rather straightforward particularly if the reader has some previous knowledge of the single head juice extractor mentioned in the above referenced patents. A fruit or vegetable, such as the apple for example, shown as 92, is queued in the feed chute 94 behind the fruit lift 96. When the fruit lift 96, which is attached to and moves virtually with the motion of the upper cup drive arm 26, has picked up an apple from the queue it will deposit the apple on the loading guide 22 which will direct the apple to fall into the lower cup as shown in FIG. 1. At this point the actual pressing begins as the drive mechanism of the extractor drives the upper cup drive arm 26 downwardly pushing the upper cup 32 and the press plunger 34 along as well. First contact will be made between the upper cup 32 and the lower cup 66 as the upper cup telescopes over the lower cup. In the usual embodiment the press plunger face 100 will contact the apple before the cups have fully closed together. The upper cup drive arm 26 will continue its downward stroke crushing and pressing the apple as the cups come together. At some point in the stroke the cups will be telescoped together fully (the lower edge of the upper cup will be pressed against and in contact with the ledge 102) however the press plunger 34 will continue to be driven by the drive arm 26 into the cavity defined by the cups and press the apple virtually completely out of the cup cavity. A small amount of pulp may be left in the cavity due to the contour of the lower cup floor and the need for clearance between the press plunger face 100 and the sharp edges of the knife assembly 76.

The apple pulp, now well masticated, will have been forced into the perforated tube 84. In the perforated tube the pump continues to be pressed by the orifice tube 90 cycling (in a preferred embodiment two times per upper cup cycle) into the perforated tube. As the upper cup drive arm 26 is being driven downwardly the orifice tube drive arm is being driven upwardly and causing the orifice tube 90 to push against the pulp in the perforated tube. As this is being done juice from the apple pulp is extruded out the small perforations 86 and the large apertures 82 of the strainer tube. Apple juice is collected in the juice manifold 72 and exits via a discharge pipe to a collection tank.

Pulp from the inside of the strainer tube works its way down the surface of the orifice tube and ultimately falls away from the surface cavities of the orifice tube. The relatively dry pulp can be collected in the discharge zone for further use.

The invention herein, as stated above, can be used to extract juice from various types of fruits and vegetables, and minor modifications of the equipment can be made to accommodate these different types of produce being juiced. Such modifications and nuances of design are contemplated as being within the scope of the following claims.

What is claimed:

1. A juice press having a lower cup support means for use in extracting juice from fruits and vegetables, said juice press having an upper solid-walled cup, and upper cup drive arm, a strainer tube, an orifice tube and an orifice tube drive arm, said juice press comprising:

press plunger means, having an outside diameter, carried on said upper cup drive arm, said upper solid-walled cup surrounding the outside diameter of said press plunger;

a lower cup, having an inside diameter substantial equal to said outside diameter of said press plunger means, mounted to said lower cup support means, said lower cup aligned with said upper solid-walled cup and said press plunger means whereby said upper solid-walled cup engages said lower cup in a telescopic relationship when said upper cup drive arm drives said press plunger means into the cavity defined by said upper solid-walled cup and said lower cup whereby virtually all of said fruit or vegetable in the cavity is forced through said strainer tube as the press plunger means is driven into said lower cup;

said orifice tube carried on said orifice tube drive arm in alignment with said upper solid-walled cup whereby said orifice tube is driven through said strainer tube by said orifice tube drive arm while said upper cup drive arm drives said press plunger means into said lower cup.

2. The invention in accordance with claim 1 wherein said lower cup includes an aperture in the bottom of said cup to which juice collection manifold means may be attached.

3. The invention in accordance with claim 2 further comprising a strainer tube means wherein said juice collection manifold means surrounds and supports said strainer tube means.

4. The invention in accordance with claim 3 wherein said strainer tube means includes a plurality of small perforations in said strainer tube.

5. The invention in accordance with claim 3 wherein said strainer tube means includes a strainer tube having large apertures in its surface and an inner perforated tube having small perforations therethrough.

6. A juice press for extracting juice from fruits and vegetables, said juice press having a strainer tube, an orifice tube and means for driving said fruit or vegetable into said strainer tube, said means comprising:

a lower cup having an aperture in the bottom of said lower cup;

an upper cup mounted in a telescopic relationship with said lower cup whereby said upper cup can surround said lower cup when said fruit or vegetable is being driven into said strainer tube;

press plunger means slidably mounted to move through said lower cup when said upper cup is positioned around said lower cup whereby movement of said press plunger means through said lower cup will force substantially all of said fruit or vegetable out of said lower cup and into said strainer tube.

7. The invention in accordance with claim 6 wherein an orifice tube is mounted for reciprocal movement in said strainer tube.

8. The invention in accordance with claim 7 wherein said orifice tube is driven by means of an orifice tube drive arm.

9. The invention in accordance with claim 8 wherein said orifice tube will be reciprocated toward said press plunger means by said orifice tube drive arm as said press plunger means is moved through said lower cup.

10. The invention in accordance with claim 9 wherein virtually the entire fruit or vegetable is driven into said strainer tube and passes between said strainer tube and said orifice tube.

* * * * *